United States Patent
Quinn et al.

(10) Patent No.: US 10,148,749 B2
(45) Date of Patent: Dec. 4, 2018

(54) LOCAL CONNECTION AND SHARING SYSTEM

(71) Applicant: Dell Products L.P., Round Rock, TX (US)

(72) Inventors: Liam B. Quinn, Austin, TX (US); Sean P. O'Neal, Austin, TX (US); Fernando L. Guerrero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 14/172,786

(22) Filed: Feb. 4, 2014

(65) Prior Publication Data

US 2015/0222699 A1 Aug. 6, 2015

(51) Int. Cl.
*G06F 15/16* (2006.01)
*H04L 29/08* (2006.01)

(52) U.S. Cl.
CPC .............................. *H04L 67/1091* (2013.01)

(58) Field of Classification Search
CPC ................................................... H04L 67/1091
See application file for complete search history.

(56) References Cited

U.S. PATENT DOCUMENTS

| | | | | |
|---|---|---|---|---|
| 8,428,038 B1* | 4/2013 | Buttles | .................... | H04L 63/18 370/338 |
| 9,585,184 B1* | 2/2017 | Sheriff | ................ | H04W 76/025 |
| 2004/0072581 A1* | 4/2004 | Tajima | .................. | H04W 36/32 455/456.1 |
| 2006/0046736 A1* | 3/2006 | Pering | .................. | H04B 1/1615 455/452.2 |
| 2009/0192912 A1* | 7/2009 | Griffin | .................... | G06Q 20/10 705/26.1 |
| 2009/0257379 A1* | 10/2009 | Robinson | .............. | H04W 16/14 370/329 |
| 2010/0036854 A1* | 2/2010 | Regan | ...................... | H04N 5/76 725/105 |
| 2011/0082940 A1* | 4/2011 | Montemurro | .......... | H04L 69/24 709/227 |

(Continued)

FOREIGN PATENT DOCUMENTS

JP WO 2013157460 A1 * 10/2013 ............ H04W 88/10

*Primary Examiner* — Moustafa M Meky
*Assistant Examiner* — Sm Z Islam
(74) *Attorney, Agent, or Firm* — Haynes and Boone, LLP

(57) ABSTRACT

A local connection and sharing system includes a first local IHS that includes a plurality of communication systems, and a second local IHS that includes at least one communication system. The first local IHS receives communication capabilities of the second local IHS using one of its communication systems and uses those communication capabilities to select a first communication system to provide a peer-to-peer connection with the second local IHS. The first local IHS then provides the second local IHS access through the peer-to-peer connection to a first data storage area that is coupled to the first IHS. The first local IHS then performs at least one of (1) sending data that is stored in the first data storage area through the peer-to-peer connection to the second local IHS, and (2) storing data that is received through the peer-to-peer connection from the second local IHS in the first data storage area.

20 Claims, 16 Drawing Sheets

(56) References Cited

U.S. PATENT DOCUMENTS

| | | | | |
|---|---|---|---|---|
| 2013/0185654 A1* | 7/2013 | Harris | .......... | H04W 4/206 |
| | | | | 715/753 |
| 2014/0141714 A1* | 5/2014 | Ghosh | .......... | H04L 29/08 |
| | | | | 455/39 |
| 2014/0233547 A1* | 8/2014 | Vallabhu | .......... | G06F 9/44 |
| | | | | 370/338 |
| 2014/0256250 A1* | 9/2014 | Cueto | .......... | H04B 5/0031 |
| | | | | 455/41.1 |
| 2015/0055637 A1* | 2/2015 | Miyazawa | .......... | H04W 88/10 |
| | | | | 370/337 |

* cited by examiner

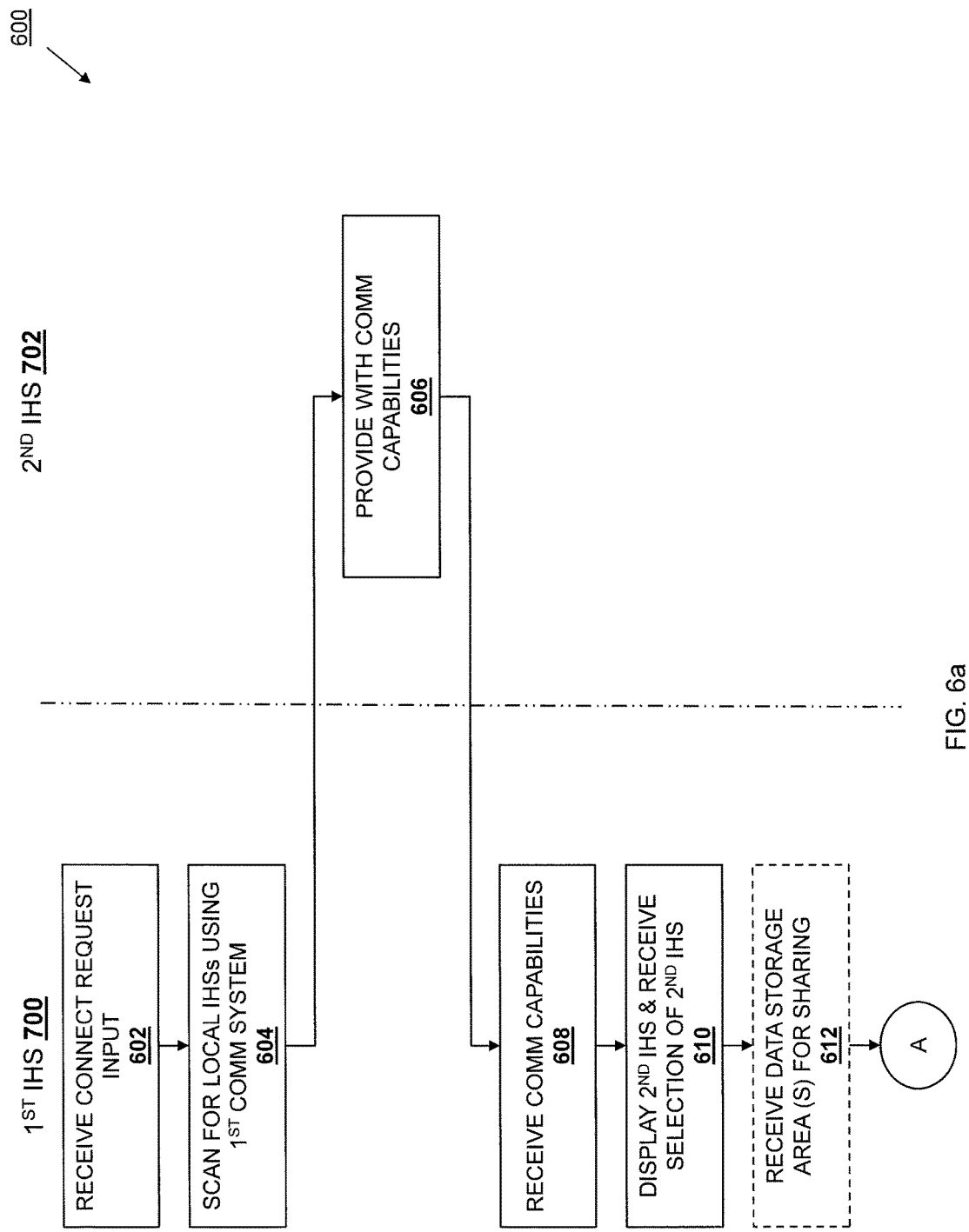

LOCAL CONNECTION AND SHARING SYSTEM

BACKGROUND

The present disclosure relates generally to information handling systems, and more particularly to system for locally connecting information handling systems for sharing data.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are commonly used for sharing data. However, conventional systems used to share data between local IHSs suffer from a number of deficiencies. A plurality of IHSs may be local relative to each other when those IHSs are located in the same physical location (e.g., the same room) or proximate to each other's physical locations (e.g., the same building). Conventional systems for sharing data between such local IHSs include connecting a portable storage drive (e.g., a "flash" drive or "thumb" drive) to a first local IHS, copying first IHS data from the first local IHS to that portable storage drive, disconnecting that portable storage drive from the first local IHS, connecting the portable storage drive to a second local IHS, and copying the first IHS data from the portable flash drive to the second local IHS. This time-consuming and repetitive process must be repeated each time any local IHS wants to share data with any other local IHS.

Accordingly, it would be desirable to provide an improved local connection and sharing system.

SUMMARY

According to one embodiment, a local connection and sharing system includes a first local information handling system (IHS) including a plurality of first local IHS communication systems; and a second local IHS including at least one second local IHS communication system; wherein the first local IHS is configured to: receive communication capabilities of the second local IHS using one of the plurality of first local IHS communication systems; provide a peer-to-peer connection with the second local IHS using one of the plurality of first local IHS communication systems and the at least one second local IHS communication system, wherein the one of the plurality of first local IHS communication systems that is used to provide the peer-to-peer connection with the second local IHS is selected based on the communication capabilities of the second local IHS; provide the second local IHS access through the peer-to-peer connection with the second local IHS to a first data storage area that is coupled to the first IHS; and perform at least one of (1) sending data that is stored in the first data storage area through the peer-to-peer connection with the second local IHS, and (2) storing data that is received through the peer-to-peer connection with the second local IHS in the first data storage area.

BRIEF DESCRIPTION OF THE DRAWINGS

FIG. 6a is a flow chart illustrating an embodiment of a portion of a method for locally connecting and sharing data.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a tablet computer, a smartphone, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
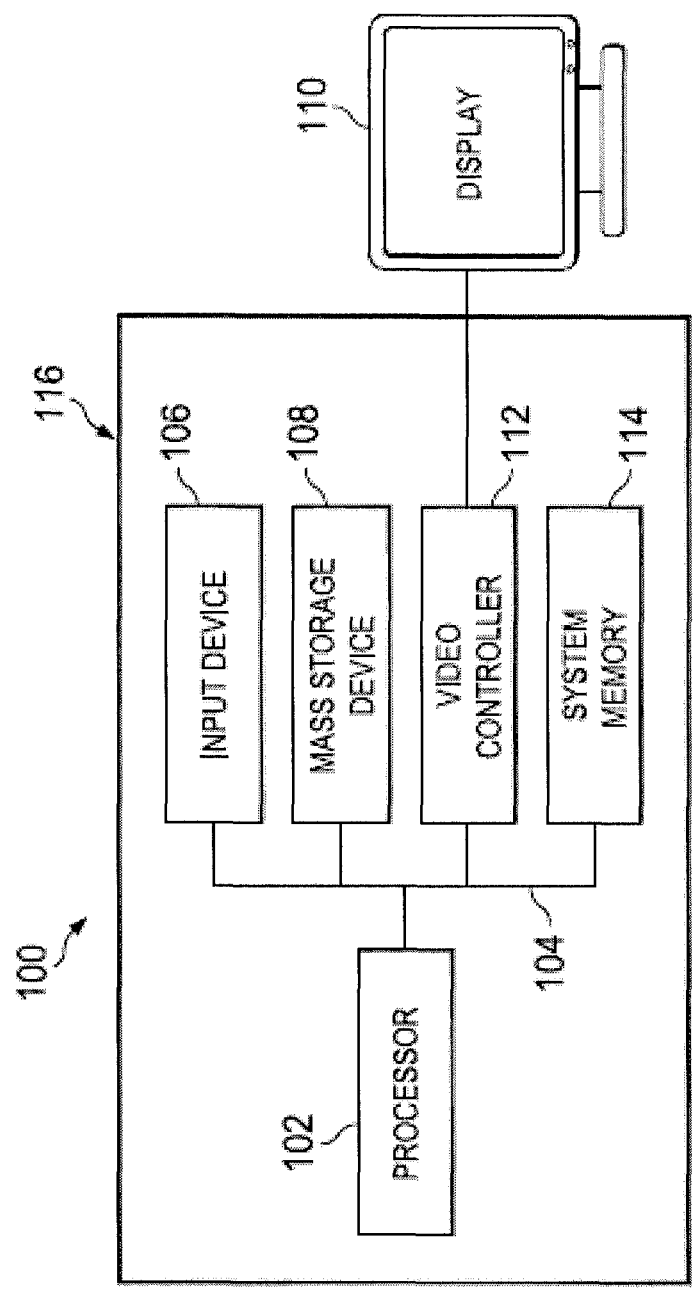
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as a mouse device, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
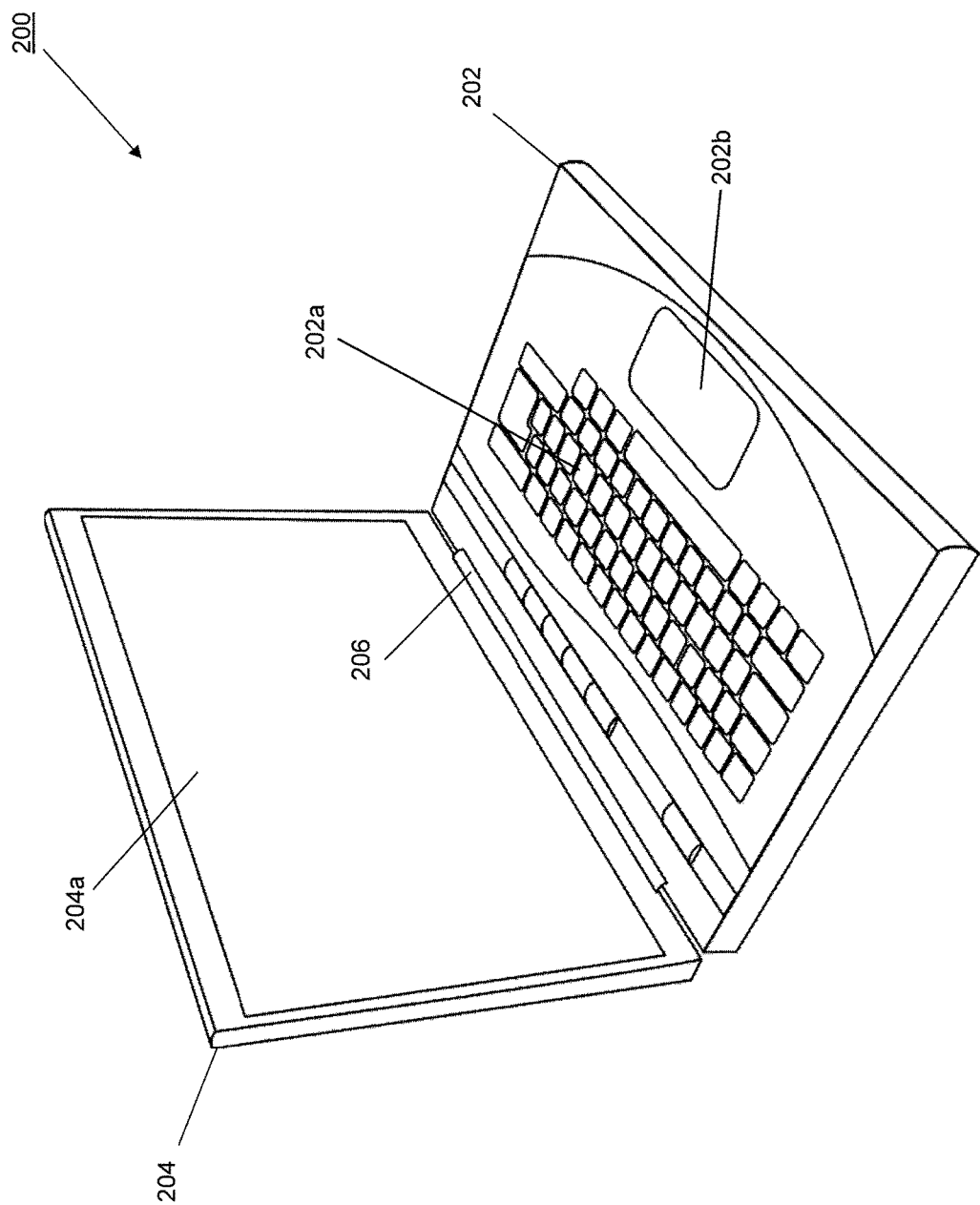
FIG. 2 is a perspective view illustrating an embodiment of an information handling system.
Figure 3:
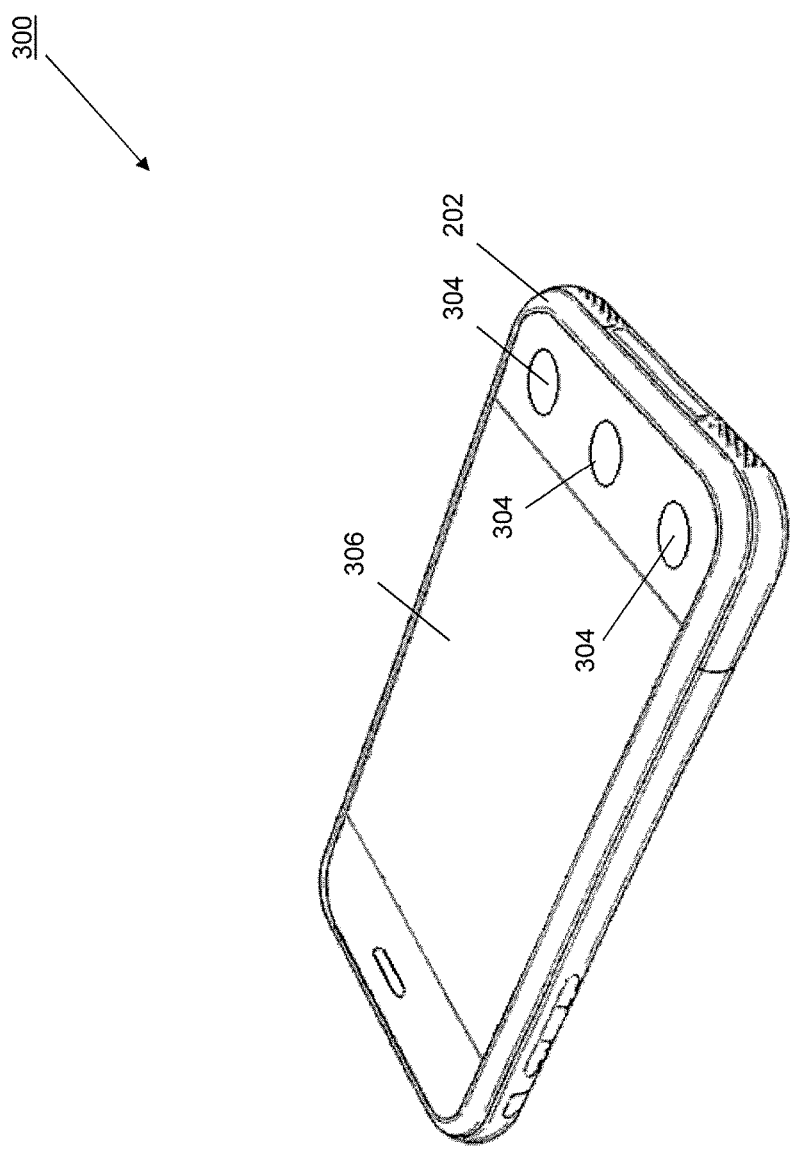
FIG. 3 is a perspective view illustrating an embodiment of an information handling system.
Figure 4:
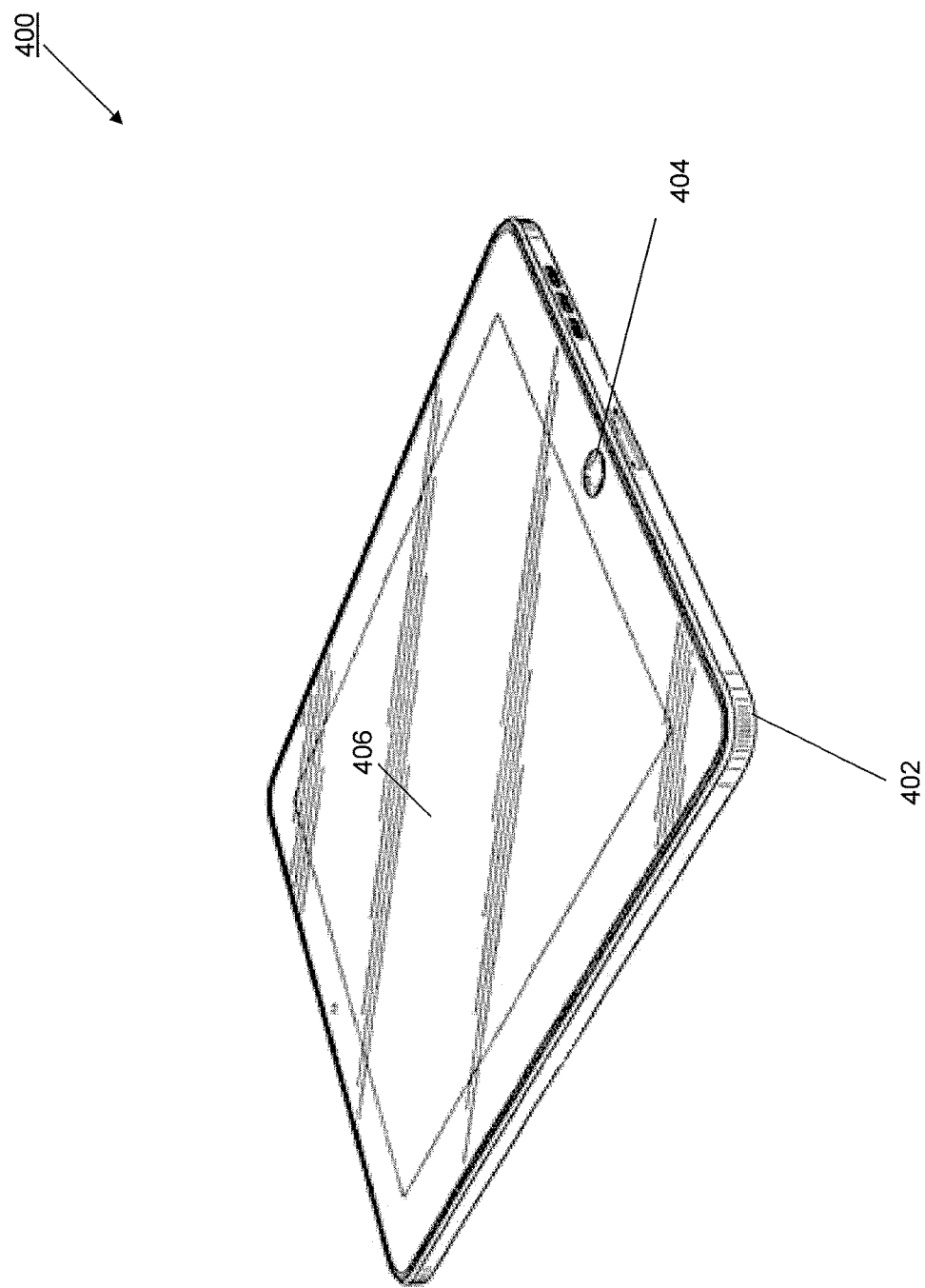
FIG. 4 is a perspective view illustrating an embodiment of an information handling system.

Referring now to FIG. 2, an embodiment of an IHS 200 is illustrated. In an embodiment, the IHS 200 may be the IHS 100 discussed above with reference to FIG. 1 and/or may include some or all of the components of the IHS 100. The IHS 200 includes a chassis base portion 202 that is coupled to a chassis display portion 204 by a moveable coupling 206 (e.g., a hinge). The base portion includes a plurality of input devices 202a (e.g., a keyboard) and 202b (e.g., a touchpad), while the display portion 204 includes a display device 204a. Referring next to FIG. 3, an embodiment of an IHS 300 is illustrated. In an embodiment, the IHS 300 may be the IHS 100 discussed above with reference to FIG. 1 and/or may include some or all of the components of the IHS 100. The IHS 300 includes a chassis base 302 having a plurality of input devices 304 (e.g., input buttons) and a display device 306 that may also function as an input device (e.g., a touch input display screen). Referring next to FIG. 4, an embodiment of an IHS 400 is illustrated. In an embodiment, the IHS 400 may be the IHS 100 discussed above with reference to FIG. 1 and/or may include some or all of the components of the IHS 100. The IHS 400 includes a chassis base 402 having an input device 404 (e.g., an input button) and a display device 406 that may also function as an input device (e.g., a touch input display screen). One of skill in the art will recognize that the IHSs 200, 300, and 400 are illustrated as a laptop/notebook IHS, a phone IHS, and a tablet IHS, respectively, but it should be understood that the teachings of the present disclosure may be applied to desktop IHSs, server IHSs, and/or a variety of other IHSs known in the art. As such, while the IHSs 200, 300, and 400 illustrated and described above are all portable IHSs, the teachings of the present disclosure are envisioned as providing benefits similar to those discussed below to any types of local IHSs that may transfer data between each other.

Figure 5:
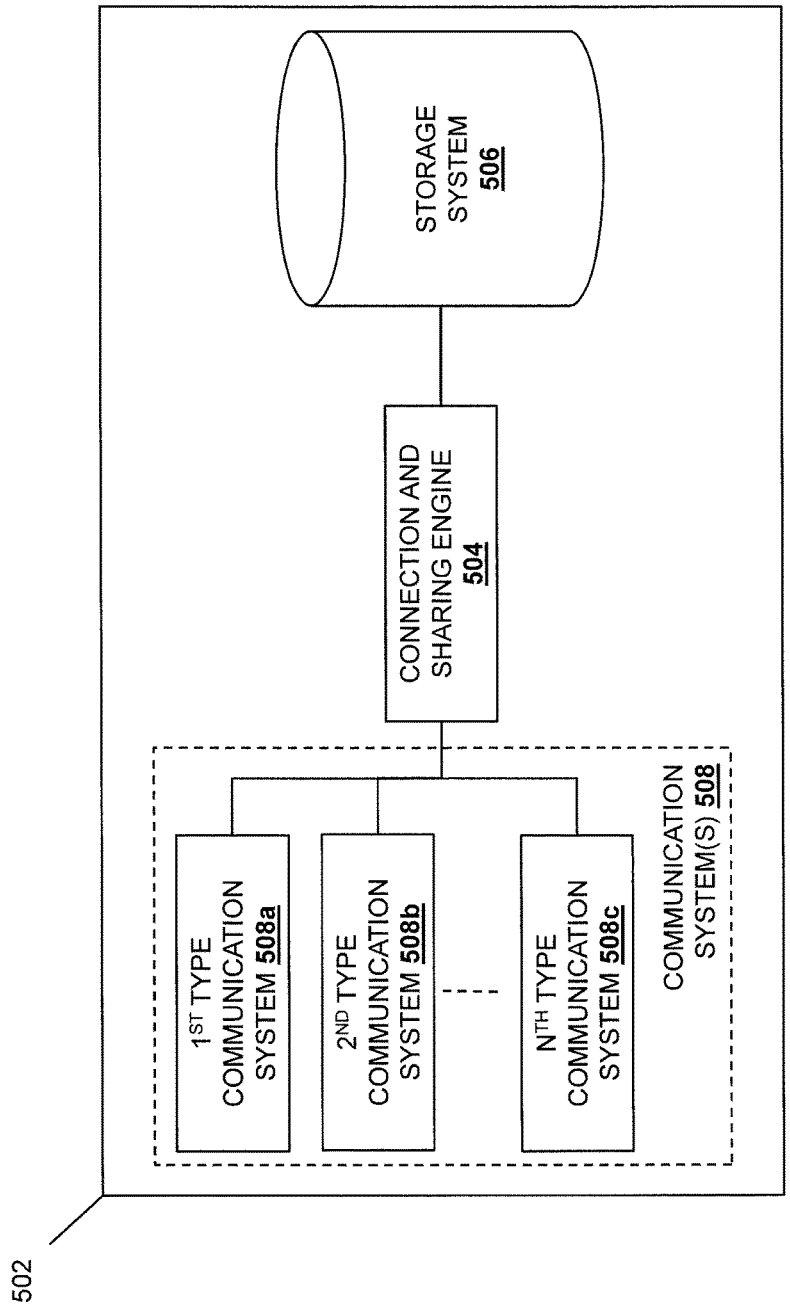
FIG. 5 is a schematic view illustrating an embodiment of an information handling system.

Referring now to FIG. 5, an embodiment of an IHS 500 is illustrated. In an embodiment, the IHS 500 may be any of the IHSs 200, 300, and/or 400 discussed above, and/or any of the IHSs 200, 300, and/or 400 may include the components of the IHS 500. The IHS 500 includes a chassis 502 that houses a processing system (e.g., the processor 102 discussed above with reference to FIG. 1) and a memory system (e.g., the system memory 114 discussed above with reference to FIG. 1.) In an embodiment, the memory system includes instruction that, when executed by the processing system, cause the processing system to provide a connection and sharing engine 504 that is configured to perform the functions of the connection and sharing engines discussed below. In an embodiment, the connection and sharing engine 504 provide an IHS application that is configured to operate on the IHS 500. The chassis 502 houses a storage system 506 (e.g., the storage device 108 discussed above with reference to FIG. 1) that is coupled to the connection and sharing engine 504 (e.g., via a coupling between the processing system and the storage system 506). While the storage system 506 is illustrated and described as being housed in the chassis 502, in some embodiments, the storage system 506 may be coupled to the connection and sharing engine 504 from outside the chassis 502 (e.g., via a cable, network, and/or other storage system couplings known in the art.) The chassis 502 also houses communication system(s) 508 that are coupled to the connection and sharing engine 504 (e.g., via a coupling between the processing system and the communication system(s) 508).

The communication system(s) 508 may include one or more types of communications systems. In the illustrated embodiment, the communication system 508 includes a first type communication system 508a, a second type communication system 508b, and up to an Nth type communication system 508c. For example, the IHS 500 may include a Bluetooth type communication system (e.g., Bluetooth 4.0 Low Energy ("BLE"), prior versions of Bluetooth, and future versions of Bluetooth), an 802.11n Wi-Fi type communication system, an 802.11ac Wi-Fi type communication system, an 802.11ad Wi-Fi type communication system (e.g., a "WiGig" type communication system), and/or a variety of other types of communication systems known in the art. While examples of a few current communication system technologies have been provided that include Wi-Fi communications systems that operate in the 2.4 GHz, 5 GHz, and 60 GHz frequencies, the present disclosure is also intended to cover future communication system technologies such as, for example, communication systems that are to be released in the future and that will utilize sub-Ghz frequencies bands. As discussed in further detail with regard to the method below, any of the IHSs may include one or more types of such communication systems, and in many embodiments, each of the IHSs will include more than one type of communication system as illustrated in the IHS 500 in FIG. 5.

Figure 6B:
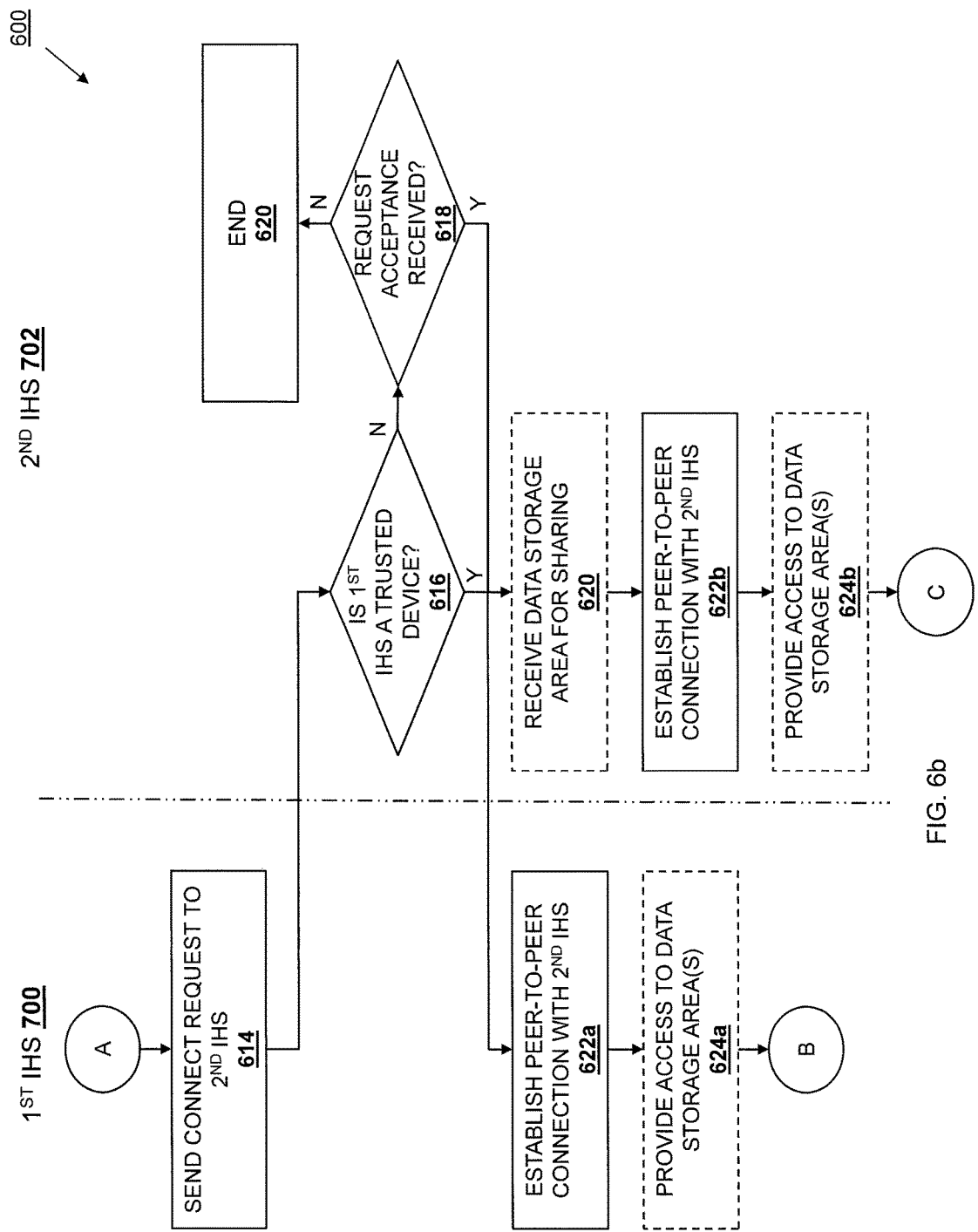
FIG. 6b is a flow chart illustrating an embodiment of a portion of a method for locally connecting and sharing data.
Figure 6C:
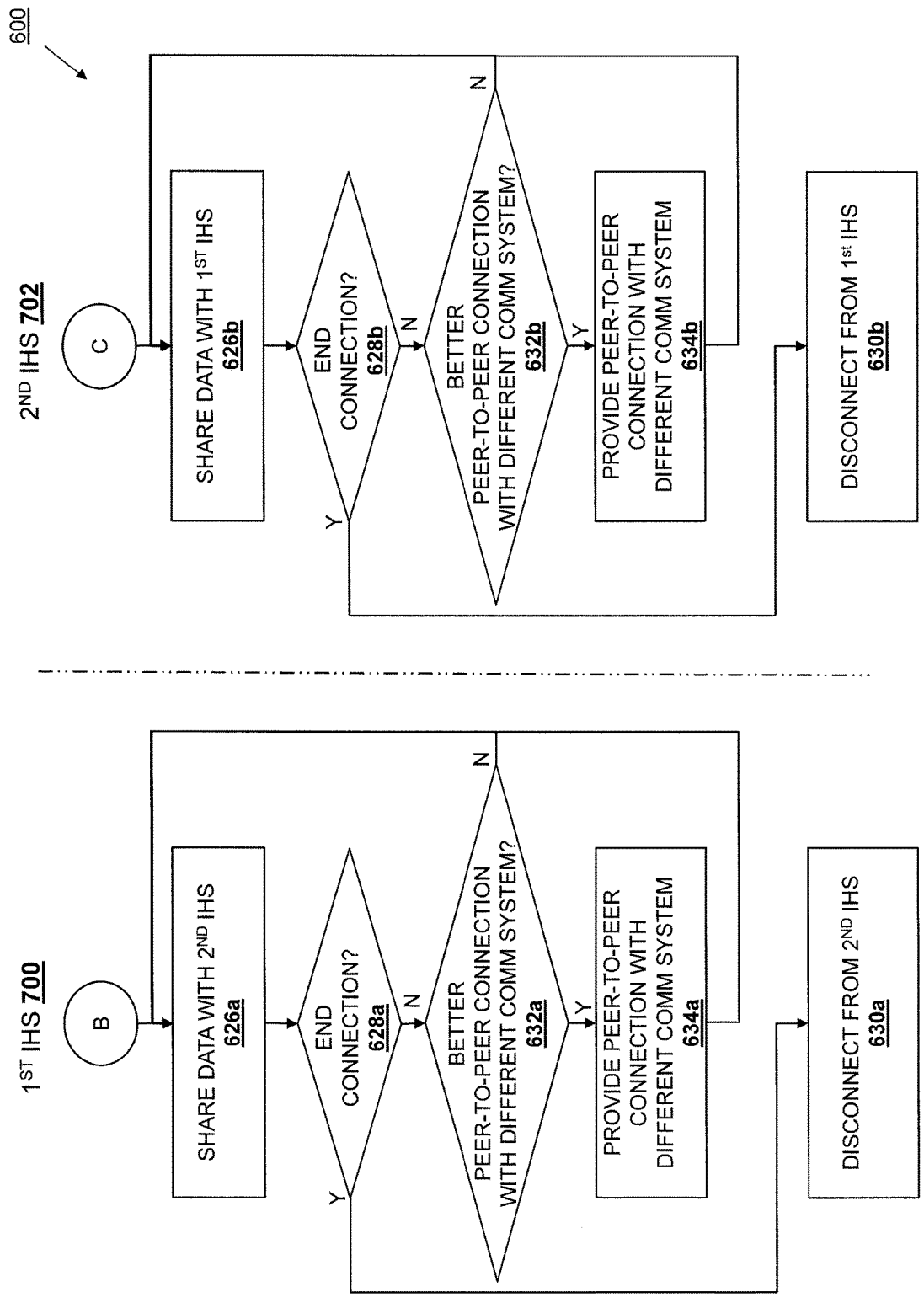
FIG. 6c is a flow chart illustrating an embodiment of a portion of a method for locally connecting and sharing data.
Figure 7A:
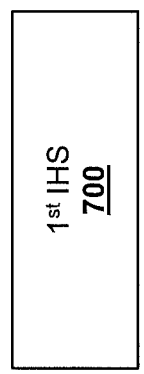
FIG. 7a is a schematic view illustrating an embodiment of a plurality of local information handling systems.
Figure 7A:
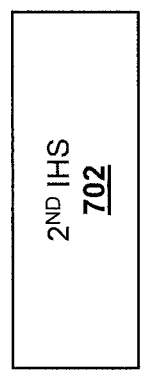

Referring now to FIGS. 6a, 6b, and 6c, an embodiment of a method 600 for local connection and data sharing is illustrated. With reference also to FIG. 7a, the method 600 includes a flow chart that is separated to indicate blocks that are performed by a first IHS 700 that initiates a local connection and data sharing with a second IHS 702. Each of the first IHS 700 and the second IHS 702 may be the IHS 500 discussed above with reference to FIG. 5 and/or include some or all of the component of the IHS 500. As such, reference to the components of the first IHS 700 and the second IHS 702 may be to the reference numbers for the components of the IHS 500. In the embodiments discussed below, the first IHS 700 and the second IHS 702 are "local" due to their proximity (e.g., in the same room, same building, etc.) that allows them, via each of their communications system(s) 508, to establish and maintain a peer-to-peer connection with each other, discussed in further detail below. However, the first IHS 700 and the second IHS 702 may be considered local based on a variety of other factors known in the art while remaining within the scope of the present disclosure. Thus, FIG. 7a illustrates the first IHS 700 and the second IHS 702 proximate each other such that they may be considered "local" to each other, but not initially connected or communicating. For example, in the embodiments discussed below, a first user with the first IHS 700 (e.g., the laptop/notebook IHS 200 of FIG. 2) is in the same room as a second user with the second IHS 702 (e.g., the tablet IHS 400 of FIG. 4), and the first user wishes to connect to and share data with the second user view their respective IHSs.

The method 600 begins at block 602 where the first IHS 700 receives a connect request input. In an embodiment, the first user may provide an connect request input to the connection and sharing engine 504 on the first IHS 700 (e.g., by opening the IHS application provided by the connection and sharing engine 504 on the first IHS 700, selecting a connect request input provided by that IHS application, etc.). The connection and sharing engine 504 on the first IHS 700 receives the connect request input from the first user, and the method 600 then proceeds to block 604 where a first communication system in the first IHS 700 is used to scan for local IHSs. In an embodiment, the connection and sharing engine 504 in the first IHS 700 uses the first communication system 508a in the first IHS 700 to scan for local IHSs. For example, the first communication system 508a may be a Bluetooth communication system such as, for example, a Bluetooth 4.0 Low Energy communication system, and at block 604 the connection and sharing engine may use the Bluetooth communication system in the first IHS 700 to scan for local IHSs. In some embodiments, the connection and sharing engine 504 on the first IHS 700 may run in the background of the first IHS 700. These embodiments may allow for the omission of block 602 such that the connection and sharing engine 504 in the first IHS 700 uses the first communication system 508a to periodically scan for local IHSs at block 604 without instruction from the first user.

Figure 7B:
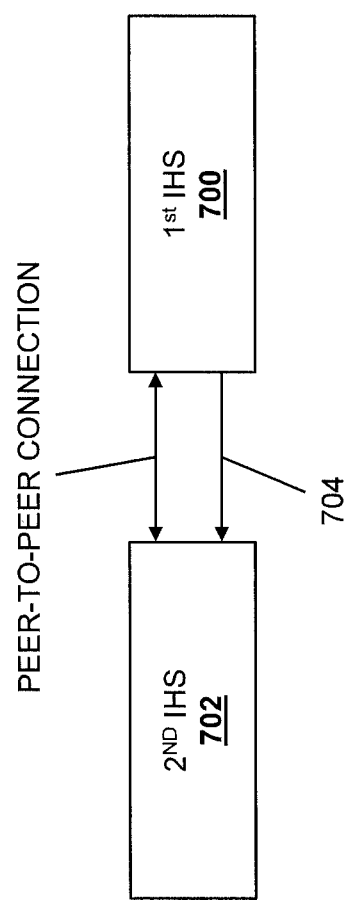
FIG. 7b is a schematic view illustrating an embodiment of a plurality of local information handling systems communicating.

The method 600 then proceeds to block 606 where the second IHS 702 provides the communication capabilities of the second IHS 702. In an embodiment, the connection and sharing engine 504 in the second IHS 702 may use one of its communication systems 508 to broadcast 704 the communication capabilities of the second IHS 702, as illustrated in FIG. 7b. For example, the first communication system 508a in the second IHS 702 may be a Bluetooth communication system such as, for example, a Bluetooth 4.0 Low Energy communication system, and at block 606 the connection and sharing engine 504 may use the Bluetooth communication system in the second IHS 702 to broadcast the wireless communications capabilities of the second IHS 702 that may include, for example, the types of communication systems available in the second IHS 702, the details of the communication systems available in the second IHS 702, and/or a variety of other wireless communication capabilities known in the art.

The method 600 then proceeds to block 608 where the first IHS 700 receives the communication capabilities of the second IHS 702. In an embodiment, the connection and sharing engine 504 in the first IHS 700 receives the communication capabilities of the second IHS 702 through the first communication system 508a. For example, using the example provided above, the connection and sharing engine 504 in the first IHS 700 may receive the communication capabilities broadcast via a Bluetooth communication system in the second IHS 702 through a Bluetooth communications system in the first IHS 700. In an embodiment, at blocks 604, 606, and/or 608, the second IHS 702 may provide (and the first IHS 700 may receive) the communication capabilities of the second IHS 702 via the first communication systems (e.g., the Bluetooth communication systems) without the need to perform a pairing operation (e.g., a Bluetooth pairing operation that may include two devices communicating to establish a connection via the use of a passkey that is agreed upon by both devices). For example, the OBject EXchange (OBEX) communication protocol may allow for the exchange of relatively small amounts of data at blocks 604, 606, and/or 608 via the Bluetooth communication systems in the first IHS 700 and the second IHS 702 without performing a Bluetooth pairing operation.

Figure 7C:
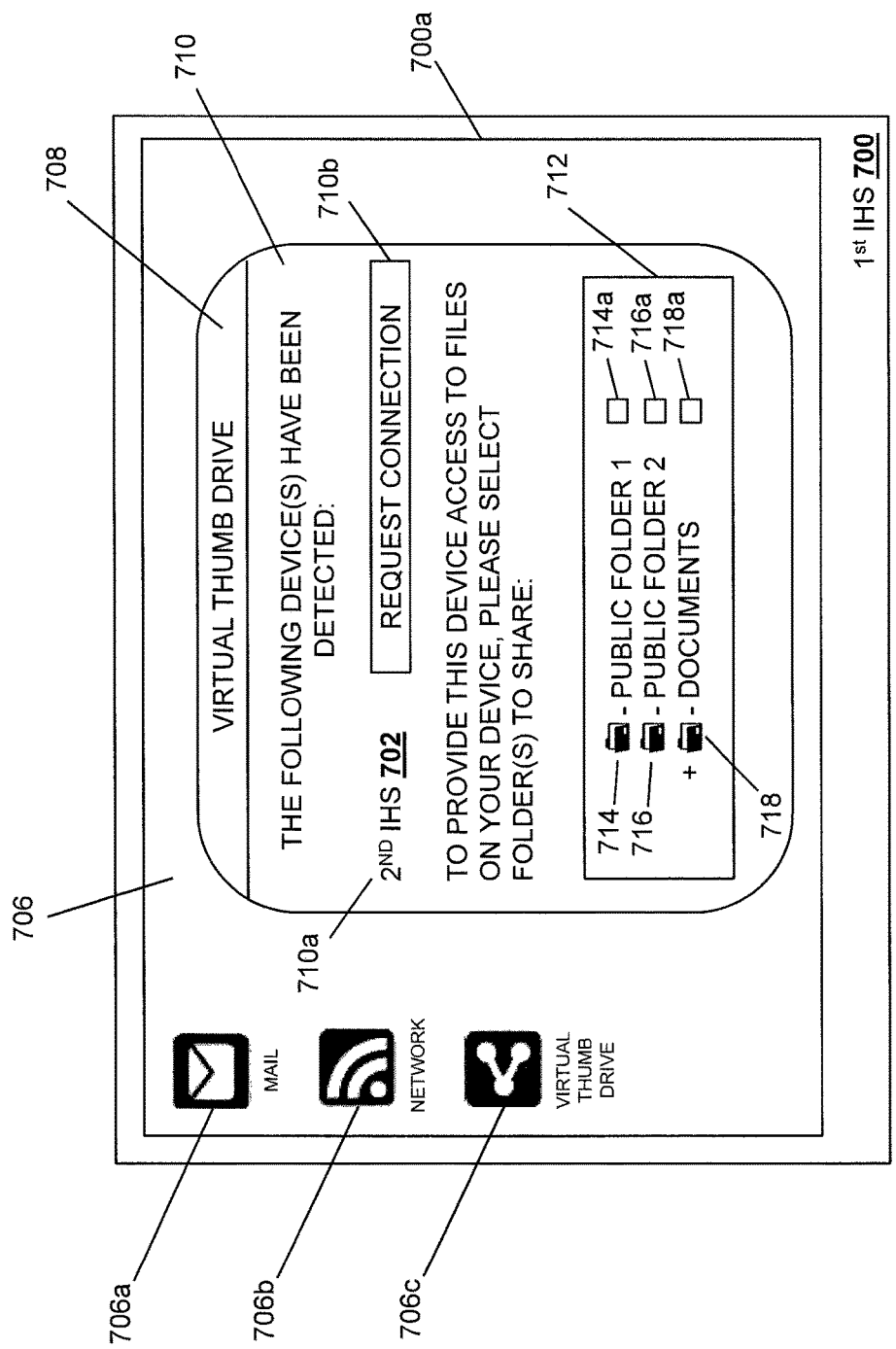
FIG. 7c is a screen shot illustrating an embodiment of an IHS detection screen.

Referring also now to FIG. 7c, the method 600 then proceeds to block 610 where the first IHS 700 displays and receives a selection of the second IHS. FIG. 7c illustrates an embodiment of the first IHS 700 including a display device 700a displaying a desktop 706 having a plurality of icons 706a, 706b, and 706c. In an embodiment, the icon 706c may allow the first user to launch (e.g., to begin the method 600) an application window 708 for an IHS application (called the "virtual thumb drive" in the illustrated embodiment) provided by the connection and sharing engine 504 on the first IHS 700. However, one of skill in the art in possession of the present disclosure will recognize that the connection and sharing engine 504 on the first IHS 700 may provide the IHS application in a variety of other manners while remaining within the scope of the present disclosure. In an embodiment, at block 610, the connection and sharing engine 504 in the first IHS 700 may provide a local IHS detection screen 710 in the application window 708 that displays a selectable indicator of the second IHS 702. For example, the local IHS detection screen 710 explains that local devices have detected, along with an indicator 710a of the detected device (the $2^{nd}$ IHS 702 in the illustrated embodiment), and a respective input 710b to request a connection to the detected device. At block 610, the first user may select the input 710b to request a connection to the second IHS 702, and that selection of the second IHS 702 is sent to the connection and sharing engine 504 in the first IHS 700.

The method 600 may then proceed to optional block 612 where the first IHS 700 receives a data storage area for sharing. In an embodiment, at optional block 612, the connection and sharing engine 504 in the first IHS 700 may provide the local IHS detection screen 710 that includes data storage areas to select for sharing. For example, the local IHS detection screen 710 explains that folders may be selected to share files in those folders with the second IHS 702, along with a folder hierarchy 712 that includes a plurality of folders 714, 716, and 718 (e.g., "PUBLIC FOLDER 1", "PUBLIC FOLDER 2", and "DOCUMENTS" in the illustrated embodiment), as well as respective selectors 714a, 716a, and 718a for each folder 714, 716, and 718. At block 610, the first user may select the associated selector(s) for any folder(s) that includes files that the first user would like to share with the second IHS 702, and those selections are sent to the connection and sharing engine 504 in the first IHS 700. As indicated, in some embodiments, optional block 612 may be omitted from the method 600. For example, the first user may not wish to share any data with the second IHS 702 (e.g., the first user is connecting to the second IHS 702 only to receive data). In another example, the first user may have previously provided folders for sharing with other IHSs (e.g., public folders such as "PUBLIC FOLDER 1" and "PUBLIC FOLDER 2" in the illustrated embodiment), and following the selection of the second IHS 702 at block 610, the second IHS 702 may simply be provided access to that public folder.

Referring now to FIG. 6*b*, the method 600 then proceeds to block 614 where the first IHS 700 sends a connect request to the second IHS 702. In an embodiment, the connection and sharing engine 504 in the first IHS 700 may use the first communication system 508*a* in the first IHS 700 to send a connect request to the second IHS 702. In an embodiment, the connect request may include communication capabilities of the first IHS 700 such as, for example, the communication systems in the first IHS 700 that are also available in the second IHS 702, file types that have been designed for sharing with the second IHS 702, and/or a variety of other communication factors kwon in the art. Using the example provided above, the connection and sharing engine 504 in the first IHS 700 may use a Bluetooth communication system in the first IHS 700 to send a connect request to the second IHS 702. In an embodiment, in response to block 614, the connection and sharing engine 504 in the second IHS 702 may receive the connect request through the first communication system 508*a* in the second IHS 702. Using the example provided above, the connection and sharing engine 504 in the second IHS 702 may receive the connect request through a Bluetooth communication system in the second IHS 700. In an embodiment, the connect request made at block 614 includes performing a pairing operation such as, for example, a Bluetooth pairing operation, between the first IHS 702 and the second IHS 704.

The method 600 then proceeds to decision block 616 where the second IHS 702 determines whether the first IHS 700 is a trusted device. In an embodiment, the second IHS 702 may include a database (e.g., in its memory system) of trusted devices for which it will automatically allow (e.g., without instructions from the second user) the peer-to-peer connections discussed below. For example, the first time the first IHS 700 connects to the second IHS 702 to share data, the second user may be required to add the first IHS 700 as a trusted device in its database, and subsequent connections by the first IHS 700 to the second IHS 702 will determine that the first IHS is a trusted device. In an embodiment of decision block 616, the connection and sharing engine 504 in the second IHS 702 determines whether the first IHS 700 is a trusted device.

Figure 7D:
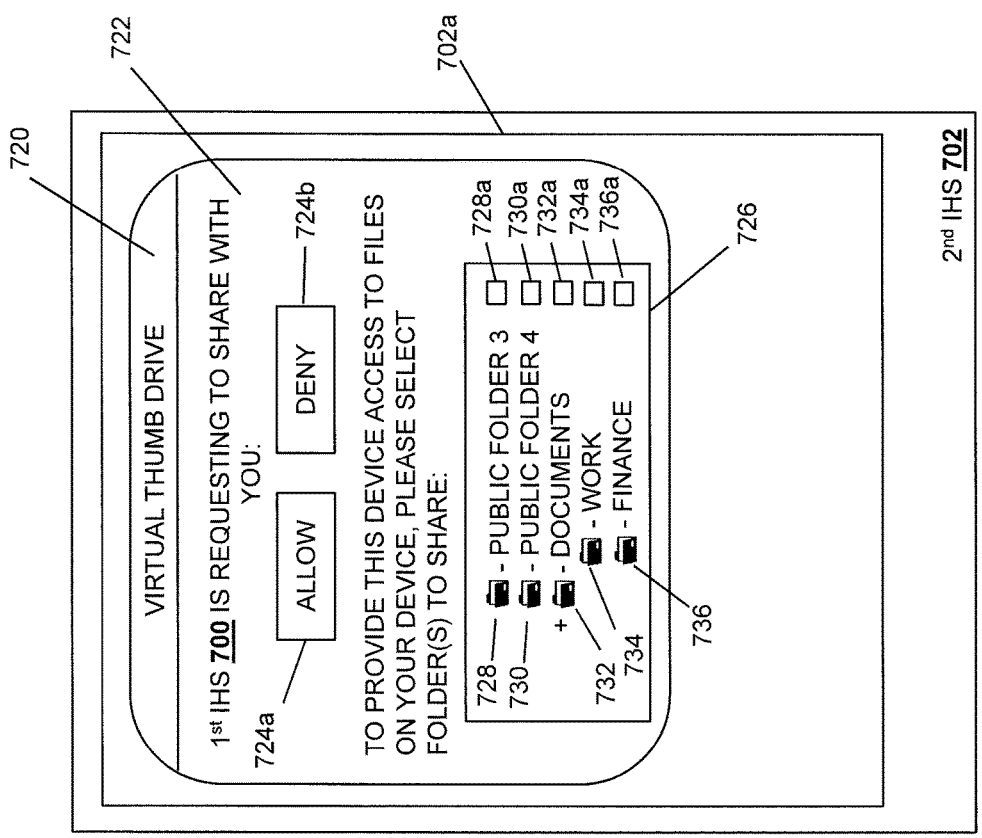
FIG. 7d is a screen shot illustrating an embodiment of a connection request screen.

Referring also now to FIG. 7*d*, at decision block 616 the second IHS 702 determines that the first IHS is not a trusted device, the method 600 proceeds to decision block 618 where the second IHS 702 determines whether a request acceptance has been received. FIG. 7*d* illustrates an embodiment of the second IHS 702 including a display device 702*a* displaying an application window 720 for an IHS application (called the "virtual thumb drive" in the illustrated embodiment) provided by the connection and sharing engine 504 on the second IHS 702. For example, the IHS application may launch and provide the application window 720 in response to receiving the connect request sent by the first IHS 700 at block 614. In another example, the application window 720 may be a "pop-up" window provided in response to receiving the connect request sent by the first IHS 700 at block 614. However, one of skill in the art in possession of the present disclosure will recognize that the connection and sharing engine 504 on the second IHS 702 may provide the IHS application in a variety of other manners while remaining within the scope of the present disclosure. In an embodiment, at decision block 618, the connection and sharing engine 504 in the second IHS 702 may provide a connection request screen 722 in the application window 720 that allows the second user to allow or deny the connection of the first IHS 700. For example, the connection request screen 722 explains that the first IHS 700 has requested to connect to share data, along with an allow connection input 724*a* and a deny connection input 724*b*. At decision block 618, the second user may select the allow connection input 724*a* or the deny connection input 724*b*, and that selection is sent to the connection and sharing engine 504 in the second IHS 702. If, at decision block 618, the connection and sharing engine 504 in the second IHS 702 determines that the second user has selected the deny connection input 724*b*, the method 600 proceeds to block 620 where the method 600 ends and the first IHS 700 may display to the first user that the second IHS 702 has denied their request to connect and share data. In an embodiment, if at decision block 618 at decision block 618, the connection and sharing engine 504 in the second IHS 702 determines that the second user has selected the allow connection input 724*a*, the connection and sharing engine 504 may add the first IHS 700 to a "trusted device" list in a database coupled to the second IHS 702 such that future connection requests from the first IHS 700 may result in the determination at decision block 606 that the first IHS 700 is a trusted device.

If, at decision block 616, the connection and sharing engine 504 in the second IHS 702 determines that the first IHS 700 is a trusted device, or if, at decision block 618, the connection and sharing engine 504 in the second IHS 702 determines that the second user has selected the allow connection input 724*a*, the method 600 may proceed to optional block 620 where the second IHS 700 receives a data storage area for sharing. In an embodiment, at optional block 620, the connection and sharing engine 504 in the second IHS 702 may provide the connection request screen 722 that includes data storage areas to select for sharing. For example, the connection request screen 722 explains that folders may be selected to share files in those folders with the first IHS 700, along with a folder hierarchy 726 that includes a plurality of folders 728, 730, and 732 (e.g., "PUBLIC FOLDER 3", "PUBLIC FOLDER 4", and "DOCUMENTS" in the illustrated embodiment) and subfolders 734 and 736 (e.g., "WORK" and "FINANCE" in the illustrated embodiment), as well as respective selectors 728*a*, 730*a*, 732*a*, 734*a*, and 736*a* for each folder and sub-folder 728, 730, 732, 734, and 736, respectively. At optional block 620, the second user may select the associated selector(s) for any folder(s) that includes files that the user would like to share with the first IHS 700, and those selections are sent to the connection and sharing engine 504 in the second IHS 702. As indicated, in some embodiments optional block 620 may be omitted from the method 600. For example, the second user may not wish to share any data with the first IHS 700 (e.g., the second user is connecting to the first IHS 700 only to receive data). In another example, the second user may have previously provided folders for sharing with other IHSs (e.g., public folders such as "PUBLIC FOLDER 3" and "PUBLIC FOLDER 4" in the illustrated embodiment), and following the determination that the first IHS 700 is a trusted device at decision block 616 or the request acceptance at decision block 618, the first IHS 700 may simply be provided access to that public folder.

The method 600 then proceeds to blocks 622*a* and 622*b* where the first IHS and the second IHS establish a peer-to-peer connection with each other. In an embodiment, the peer-to-peer connection established at block 622*a* and 622*b* is a direct connection between a communication system in the first IHS 700 and a communication system in the second IHS 702 and does not involve external infrastructure such as access points, routers, switches, or other external communication infrastructure devices. For example, the peer-to-peer connection may be an direct ad-hoc connection between the first IHS 700 and the second IHS 702. In an embodiment, the connection and sharing engine 504 in the first IHS 700 may use the communication capabilities received from the second IHS 702 at block 608 to select one of its communication systems 508 for use in providing the peer-to-peer connection. The selection of the one of the communication systems 508 may be based on the communication capabilities of the first IHS 700, the communication capabilities of the second IHS 702, the files available for sharing in the selected data storage areas on the first IHS 700 and/or the second IHS 702, the proximity of the first IHS 700 and the second IHS 702, and/or a variety of other communication factors known in the art.

In a specific embodiment, the connection and sharing engine 504 in the first IHS 700 may select the second communication system 508b and use the second communication system 508b to establish the peer-to-peer connection with the second IHS 702 upon determining that the communication capabilities of the second IHS 702 indicate that the second IHS 702 includes the same type of second communication system 508b as the first IHS 700. For example, the connection and sharing engine 504 in the first IHS 700 may determine that both the first IHS 700 and the second IHS 702 include an 802.11ad Wi-Fi communication system (e.g., a "WiGig" communication system) and are in close enough proximity (e.g., as determined by the communication between Bluetooth communication systems in the first IHS 700 and the second IHS 702) to allow those 802.11ad Wi-Fi communication systems to communication and, in response, the peer-to-peer connection may be established using the 802.11ad Wi-Fi communication system in the first IHS 700. The establishment of the peer-to-peer communication system at blocks 622a and 622b may include the connection and sharing engine 504 in the first IHS 700 informing the connection and sharing engine 504 in the second IHS 702 that the second communication system/802.11ad Wi-Fi communication system is to be used for the peer-to-peer connection. Thus, the first IHS 700 may use the first communication system 508a (e.g., a Bluetooth communication system) to receive the communication capabilities of the second IHS 702, and then automatically switch (e.g., without instructions to switch from the first user) to the second communication system 508b to provide the peer-to-peer connection.

In an embodiment, the connection and sharing engines 504 in the first IHS 700 and the second IHS 702 may be configured to only provide power to one or more of their communication system(s) in response to selecting that communication system to provide the peer-to-peer connection at blocks 622a and 622b. For example, the connection and sharing engines 504 in the first IHS 700 and the second IHS 702 may continuously provide power to their respective first communication systems 508a (e.g., their Bluetooth communication systems) to allow for discovery of each other prior to the establishment of the peer-to-peer connection, but may keep all other communication systems powered down (e.g., the 802.11ad Wi-Fi communication system may be kept powered down). However, upon receiving the communication capabilities of the $2^{nd}$ IHS 702 that indicate that a communication system in the first IHS 700 that is powered down is supported by the second IHS 702, the connection and sharing engines 504 in the first IHS 700 may then provide power to that communication system (e.g., the 802.11ad Wi-Fi communication system) in order to use that communication system to provide the peer-to-peer connection. Similarly, the connection and sharing engines 504 in the second IHS 702 may only provide power to a powered down communication system (e.g., the 802.11ad Wi-Fi communication system) for use in providing the peer-to-peer connection in response to receiving a connect request from the first IHS 700 that indicates that the powered down communication system will be used for that peer-to-peer connection.

Figure 7E:
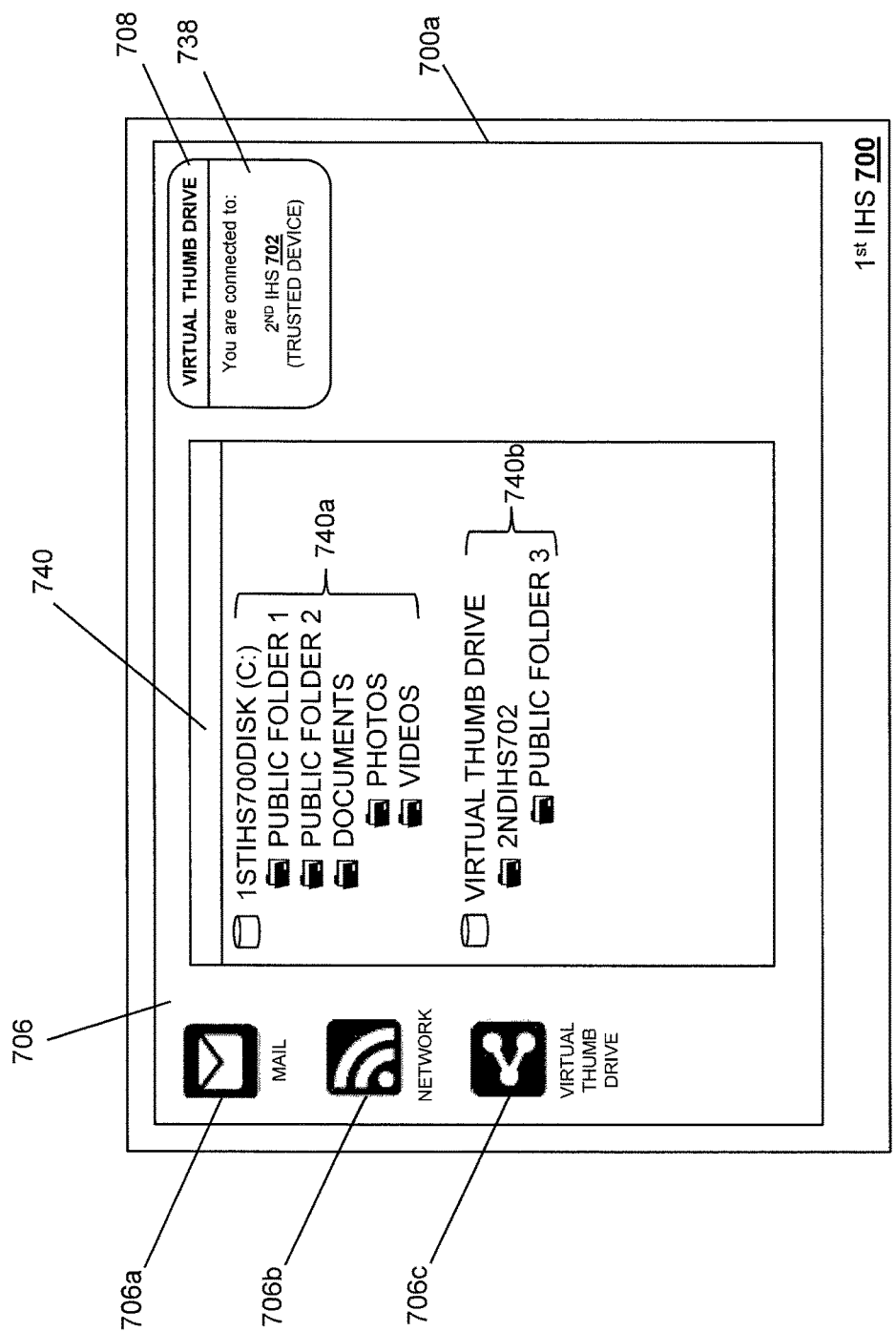
FIG. 7e is a screen shot illustrating an embodiment of a data sharing screen.

Referring also now to FIG. 7e, the method 600 then proceeds to optional blocks 624a and 624b where the first IHS 700 and the second IHS 702 provide access to their data storage area(s) if they have been shared. As discussed above with reference to FIGS. 7c and 7d, the first user and the second user may designate data storage areas such as folders that include files for sharing, or may have previously designated data storage areas such as public folders that include files for sharing. FIG. 7e illustrates an embodiment, at block 624a, of the connection and sharing engine 504 in the first IHS 700 providing a connection screen 738 in the application window 708 that indicates that the first IHS 700 is connected to the second IHS 702. Furthermore, at block 624a, the connection and sharing engine 504 in the first IHS 700 may provide, or help to provide, a file explorer window 740 that includes a first IHS section 740a that displays a disk (e.g., "FIRSTIHS700DISK(C:)") and folders and sub-folders (e.g., "PUBLIC FOLDER 1", "PUBLIC FOLDER 2", "DOCUMENTS", "PHOTOS", and "VIDEOS") associated with the first IHS 700, and a shared section 740b that displays a disk (e.g., "VIRTUAL THUMB DRIVE") associated with the connection and sharing application, a folder (e.g., "2NDIHS702") associated with the second IHS 702, and a sub-folder (e.g. "PUBLIC FOLDER 3") associated with the shared folders on the second IHS 702. In an embodiment, the sub-folder (e.g. "PUBLIC FOLDER 3") associated with the shared folders on the second IHS 702 is a folder shared on the second IHS 702 in response to the second user selecting the selector 728a discussed above with reference to FIG. 7d.

Figure 7F:
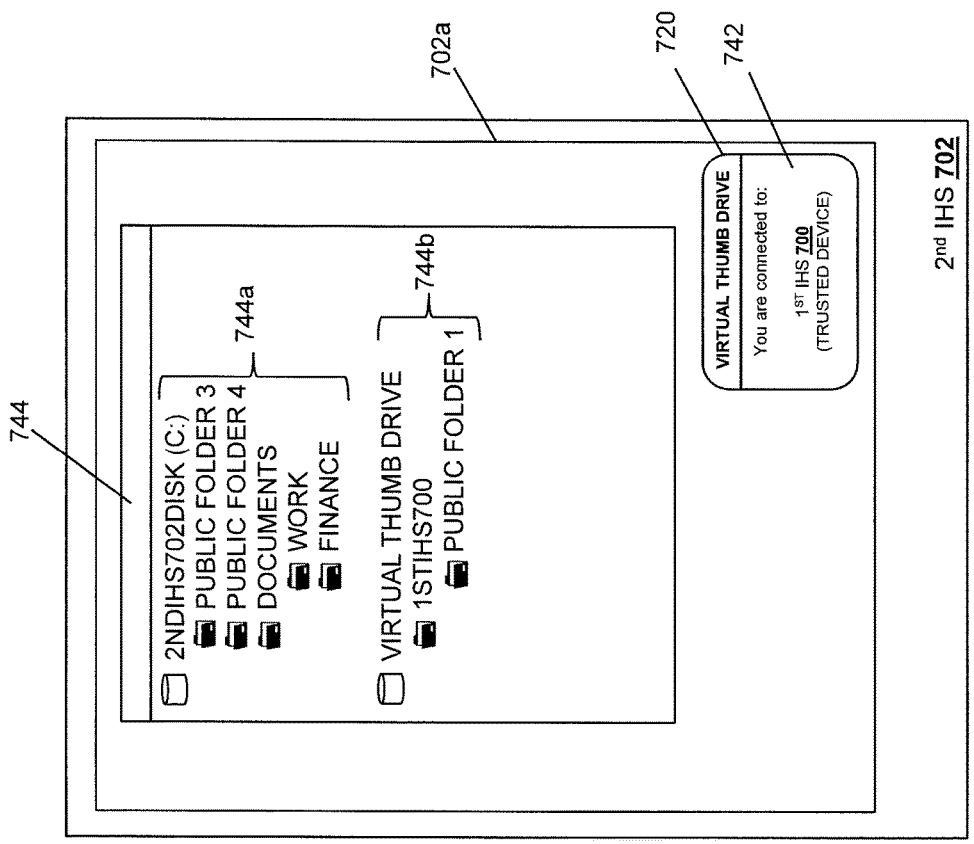
FIG. 7f is a screen shot illustrating an embodiment of a data sharing screen.

Referring also now to FIG. 7f, at block 624b, of the connection and sharing engine 504 in the second IHS 702 provides a connection screen 742 in the application window 720 that indicates that the second IHS 702 is connected to the first IHS 700. Furthermore, at block 624a, the connection and sharing engine 504 in the second IHS 702 may provide, or help to provide, a file explorer window 744 that includes a second IHS section 744a that displays a disk (e.g., "SECONDIHS702DISK(Ca")) and folders and sub-folders (e.g., "PUBLIC FOLDER 3", "PUBLIC FOLDER 4", "DOCUMENTS", "WORK", and "FINANCE") associated with the second IHS 702, and a shared section 744b that displays a disk (e.g., "VIRTUAL THUMB DRIVE") associated with the connection and sharing application, a folder (e.g., "1STIHS700") associated with the first IHS 700, and a sub-folder (e.g. "PUBLIC FOLDER 1") associated with the shared folders on the first IHS 700. In an embodiment, the sub-folder (e.g. "PUBLIC FOLDER 1") associated with the shared folders on the first IHS 700 is a folder shared on the first IHS 700 in response to the first user selecting the selector 714a discussed above with reference to FIG. 7c.

Referring now to FIG. 6c, the method 600 then proceeds to blocks 626a and 626b where the first IHS 700 and the second IHS 702 share data with each other. Referring back to FIG. 7e, the file explorer window 740 allows the first user to send data to, and receive data from, the shared data storage area on the second IHS 702 (e.g., "PUBLIC FOLDER 3"). For example, the first user may share files located in any folder on their drive (e.g., "1STIHS700DISK (C:)") with the shared data storage area on the second IHS 702 by selecting those files (not illustrated, but viewable by selecting the folders) in the file explorer window 740 and copying those files (e.g., by "dragging and dropping") into the shared folder (e.g., "PUBLIC FOLDER 3") that indicates the shared data storage on the second IHS 702. In another example, the first user may share files located in the shared data storage area on the second IHS 702 (e.g., "PUBLIC FOLDER 3") by selecting those files (not illustrated, but viewable by selecting the folder) in the file explorer window 740 and copying those files (e.g., by "dragging and dropping") into any folder on their drive (e.g., "1STIHS700DISK(C:)"). Such sharing of files causes the connection and sharing engines 504 on the first IHS 700 and/or the second IHS 702 to cause those files to be transferred between the first IHS 700 and the second IHS 702 over the peer-to-peer connection using the communication systems on the first IHS 700 and the second IHS 702. In an embodiment, sharing of data at block 626*a* may be performed using the Transmission Control Protocol/Internet Protocol (TCP/IP) for data reliability.

Referring back to FIG. 7*f*, the file explorer window 744 allows the second user to send data to, and receive data from, the shared data storage area on the first IHS 700 (e.g., "PUBLIC FOLDER 1"). For example, the second user may share files located in any folder on their drive (e.g., "2NDIHS702DISK(C:)") with the shared data storage area on the first IHS 700 by selecting those files (not illustrated, but viewable by selecting the folders) in the file explorer window 744 and copying those files (e.g., by "dragging and dropping") into the shared folder (e.g., "PUBLIC FOLDER 1") that indicates the shared data storage on the first IHS 700. In another example, the second user may share files located in the shared data storage area on the first IHS 700 (e.g., "PUBLIC FOLDER 1") by selecting those files (not illustrated, but viewable by selecting the folder) in the file explorer window 744 and copying those files (e.g., by "dragging and dropping") into any folder on their drive (e.g., "2NDIHS702DISK(C:)"). Such sharing of files causes the connection and sharing engines 504 on the first IHS 700 and/or the second IHS 702 to cause those files to be transferred between the first IHS 700 and the second IHS 702 over the peer-to-peer connection using the communication systems on the first IHS 700 and the second IHS 702. In an embodiment, sharing of data at block 626*a* may be performed using the Transmission Control Protocol/Internet Protocol (TCP/IP) for data reliability.

The method 600 may proceed to decision blocks 628*a* and 628*b* where the first IHS 700 and/or the second IHS 702 determine whether to end the peer-to-peer connection. In an embodiment of decision blocks 628*a* and 628*b*, the connection and sharing engines 504 in the first IHS 700 and/or the second IHS 702 may determine whether an instruction has been received from their user to end the peer-to-peer connection, an instruction has been received from the connected IHS to end the peer-to-peer connection, whether data transfers have ceased for a predetermined amount of time, and/or a variety of other connection ending determinations known in the art. If, at decision blocks 628*a* and 628*b*, the connection and sharing engines 504 in the first IHS 700 and/or the second IHS 702 determine that the peer-to-peer connection should be ended, the method 600 proceeds to blocks 630*a* and 630*b* where the first IHS 700 and the second IHS 702 are disconnected from each other. In an embodiment, the connection and sharing engines 504 in the first IHS 700 and/or the second IHS 702 may disconnect from their connected IHS by shutting off communications, powering down the communication system that was being used to provide the peer-to-peer connection, and/or performing a variety of other disconnection operations known in the art. In addition, the connection and sharing engines 504 in the first IHS 700 and/or the second IHS 702 may send a disconnect request to their connected IHS (and wait for a disconnect response) prior to ending the peer-to-peer connection. Following blocks 630*a* and 630*b*, the connection and sharing engines 504 in the first IHS 700 and/or the second IHS 702 may power down the communication systems that were being used to provide the peer-to-peer connection.

If, at decision blocks 628*a* and 628*b*, the connection and sharing engines 504 in the first IHS 700 and/or the second IHS 702 determine that the peer-to-peer connection should not be ended, the method 600 proceeds to decision blocks 632*a* and 632*b* where the first IHS 700 and/or the second IHS 702 determine whether the peer-to-peer connection would be better using a different one of the communication system(s) 508 in the first IHS 700 and the second IHS 702. In an embodiment, the connection and sharing engine 504 in the first IHS 700 may consider a variety of factors in determining whether a different one of the communication system(s) 508 in the first IHS 700 and the second IHS 702 would provide for a better peer-to-peer connection.

For example, data transfer over the peer-to-peer connection may cease, indicating to the connection and sharing engine 504 in the first IHS 700 that a different one of the communication system(s) 508 in the first IHS 700 and the second IHS 702 would provide for a better peer-to-peer connection. In another example, the connection and sharing engine 504 in the first IHS 700 may determine that a different one of the communication systems in the first IHS 700 and the second IHS 702 would provide for a better peer-to-peer connection based on a proximity of the first IHS 700 and the second IHS 702 (e.g., the first IHS 700 may determine that 802.11n Wi-Fi communications systems may provide for a better peer-to-peer connection than 802.11ad Wi-Fi communication systems as the distance between the first IHS 700 and the second IHS 702 increases to a point where the 802.11ad Wi-Fi communication systems cannot provide reliable communications). In some embodiments, a Bluetooth communication system in the first IHS 700 may operate (even when that Bluetooth communication system is not providing the peer-to-peer connection) to detect proximity changes between the first IHS 700 and the second IHS 702. In another example, the connection and sharing engine 504 in the first IHS 700 may determine that a different one of the communication system(s) 508 in the first IHS 700 and the second IHS 702 would provide for a better peer-to-peer connection based on that different one of the communication system(s) 508 providing a faster data transfer rate (e.g., the first IHS 700 may determine that 802.11ad Wi-Fi communications systems that provide data transfer rates up to 6.7 Gb/s may provide for a better peer-to-peer connection than 802.11nh Wi-Fi communication systems that provide data transfer rates up to 150 Mb/s). In some embodiments, a Bluetooth communication system in the first IHS 700 may operate (even when that Bluetooth communication system is not providing the peer-to-peer connection) to detect when communication systems providing for a faster data transfer rate are able to provide the peer-to-peer connection between the first IHS 700 and the second IHS 702. While a few examples have been provided, a wide variety of communication system connection quality considerations known in the art will fall within the scope of the present disclosure.

If, at decision block 632a, the first IHS 700 determines that different communication systems that would provide for a better peer-to-peer connection, the first IHS 700 may relay to the second IHS 702 that determination that use of different communication systems would provide for a better peer-to-peer connection. Thus, when the method 600 proceeds to decision block 632b, the second IHS 702 will determine whether it has received that determination from the first IHS 700 that different communication systems would provide for a better peer-to-peer connection. If, at decision block 632a, the first IHS 700 determines there are no different communication system that would provide for a better peer-to-peer connection, the method 600 returns to block 626a. Furthermore, when the first IHS 700 determines there are no different communication systems that would provide for a better peer-to-peer connection, the second IHS 702 does not receive any determination from the first IHS 700 that different communication systems would provide for a better peer-to-peer connection, and the method 600 proceeds from decision block 632b back to 626b.

If, at decision block 632a, the first IHS 700 determines there are different communication systems that would provide for a better peer-to-peer connection, the first IHS 700 relays that determination to the second IHS 702 and the method 600 proceeds from decision block 632a to block 634a where the first IHS 700 provides the peer-to-peer connection with the different communication system, as well as from decision block 632b to block 634b where the second IHS 702 provides the peer-to-peer connection with the different communication system. In an embodiment of blocks 634a and 634b, the connection and sharing engines 504 in the first IHS 700 and the second IHS 702 operate to switch the communication systems being used to provide the peer-to-peer connection. For example, connection and sharing engines 504 in the first IHS 700 and the second IHS 702 may switch from the second communication systems 508b in the first IHS 700 and the second IHS 702 to the $N^{th}$ communication systems 508c in the first IHS 700 and the second IHS 702. The method 600 then proceeds back to blocks 626a and 626b. Thus, the first IHS 700 (via blocks 626a, 628a, 632a, and 634a) and the second IHS 702 (via blocks 626b, 628b, 632b, and 634b) operate according to the method 600 to continuously monitor the peer-to-peer connection during the sharing of data between the first IHS 700 and the second IHS 702 to dynamically switch the communication systems that are used to provide that peer-to-peer connection such that the best Quality of Service (QoS) peer-to-peer connection is provided between the first IHS 700 and the second IHS 702. Any sharing of data that is disrupted by a switch between communication systems is immediately and automatically resumed upon the reestablishment of the peer-to-peer connection using the different communication systems.

Thus, systems and methods have been described that provide for the discovery, connection and sharing of data using a peer-to-peer connection that may be provided by a plurality of different communication systems during a data sharing session based on which of those communication systems provide the highest QoS peer-to-peer connection. In some embodiments, the systems and methods described herein provide a "virtual thumb drive" that replaces conventional physical thumb drives by allowing a user with a user IHS to simply launch a virtual thumb drive application on the user IHS, have the user IHS automatically detect a local IHS so that the user may select that local IHS to share data with, have the shared folders for that local IHS provided in a file explorer window on the user IHS, and allow for the sharing of data between folders on the user IHS and a shared folder of the local IHS that is displayed in the file explorer window on the user IHS.

Figure 8A:
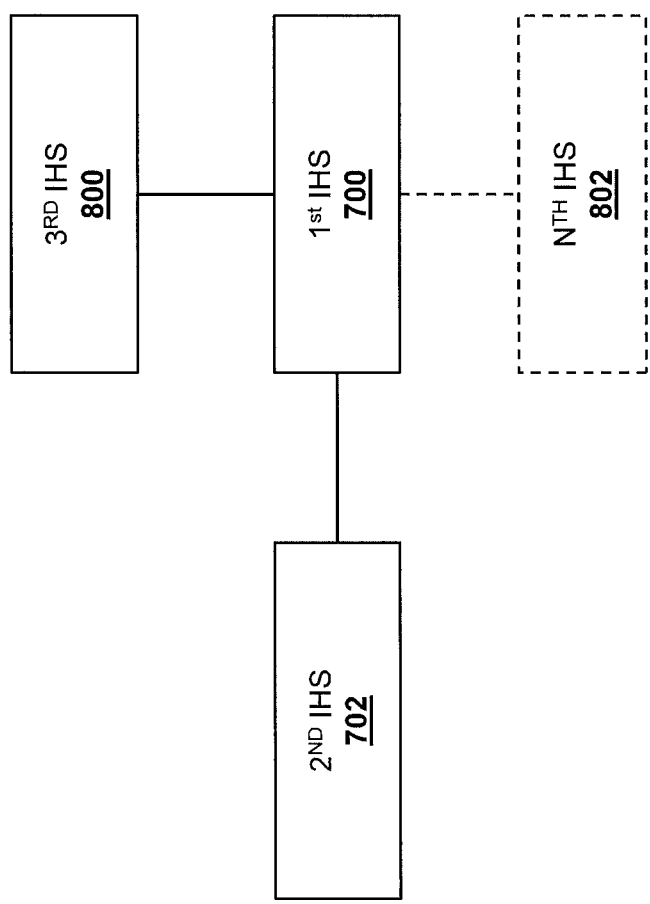
FIG. 8a is a schematic view illustrating an embodiment of a plurality of local information handling systems communicating.
Figure 8B:
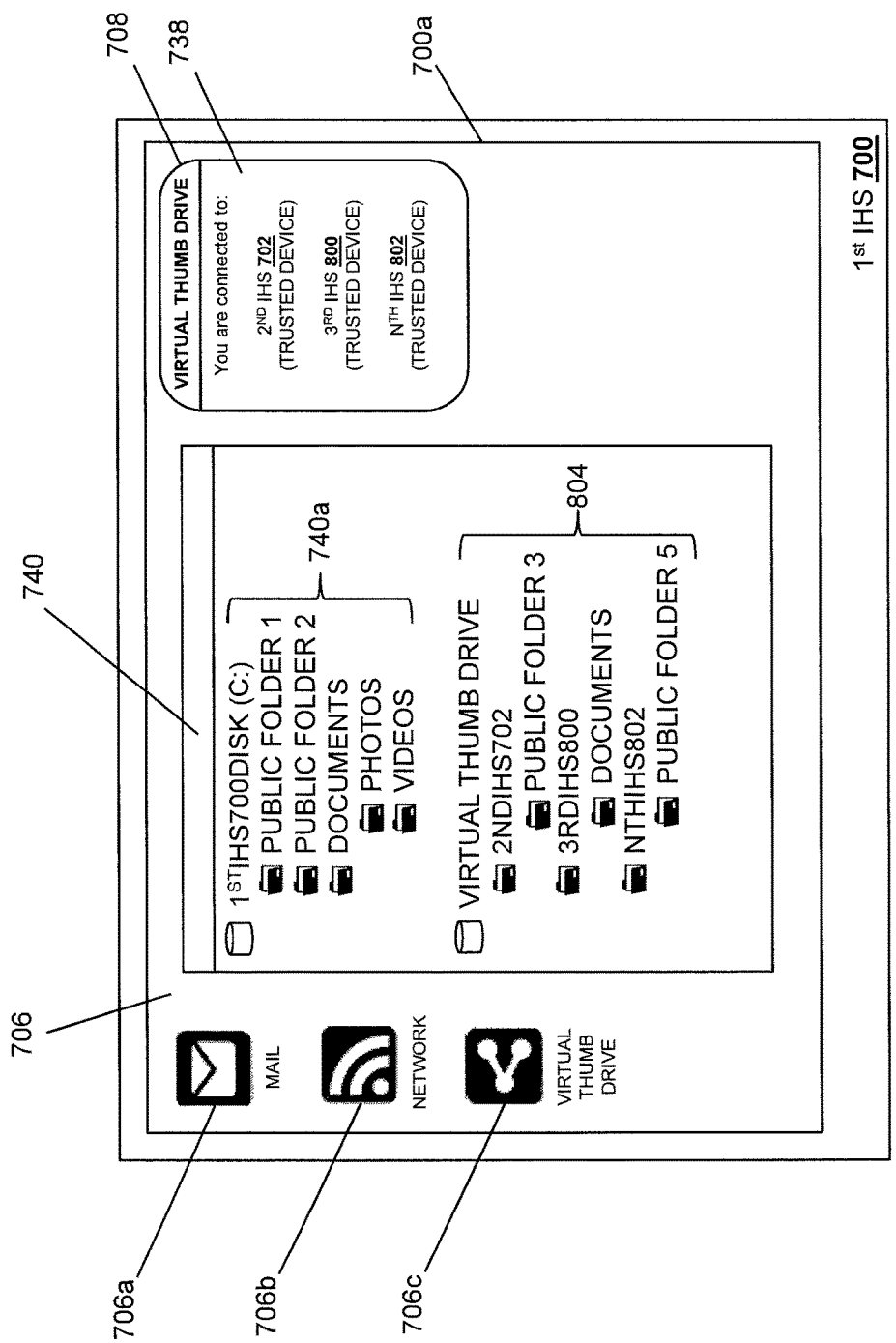
FIG. 8b is a screen shot illustrating an embodiment of a data sharing screen.

Referring now to FIGS. 8a and 8b, extensions of the systems and methods discussed above are provided to illustrate how the first IHS 700 may connect and share data with multiple IHSs at the same time. FIG. 8a illustrated how the first IHS 700 may connect to a third IHS 800 and up to an Nth IHS 802 in a substantially similar manner as discussed above for the second IHS 702 at blocks 602, 604, 606, 608, 610, 614, 616, 618, 622a, and 622b. Furthermore, the first IHS 700 may select data storage areas for sharing with each of the third IHS 800 and Nth IHS 802 in a substantially similar manner as discussed above for the second IHS 702 at block 612, and the third IHS 800 and Nth IHS 802 may select data storage areas for sharing with the first IHS 700 in a substantially similar manner as discussed above for the second IHS 702 at block 620. In some embodiments, the first IHS 700 may select different data storage areas to share with different ones of the second IHS 702, third IHS 800, and Nth IHS 802.

The first IHS 700 may share data with each of the third IHS 800 and Nth IHS 802 in a substantially similar manner as discussed above for the second IHS 702 above at blocks 624a, 624b, 626a and 626b. For example, FIG. 8b illustrates, at block 624a, the connection and sharing engine 504 in the first IHS 700 providing the connection screen 738 in the application window 708 that indicates that the first IHS 700 is connected to the second IHS 702, the third IHS 800, and the Nth IHS 802. FIG. 8b also illustrates, at block 624a, the connection and sharing engine 504 in the first IHS 700 providing, or helping to provide, the file explorer window 740 that includes the first IHS section 740a that displays the disk (e.g., "FIRSTIHS700DISK(C:)") and folders and subfolders (e.g., "PUBLIC FOLDER 1", "PUBLIC FOLDER 2", "DOCUMENTS", "PHOTOS", and "VIDEOS") associated with the first IHS 700. The file explorer window 740 also includes a shared section 804 that displays a disk (e.g., "VIRTUAL THUMB DRIVE") associated with the connection and sharing application, folders (e.g., "2NDIHS702", "3RDIHS800", AND "NTHIHS802") associated with the second IHS 702, the third IHS 800, and the Nth IHS 802, respectively, and sub-folder (e.g. "PUBLIC FOLDER 3", "DOCUMENTS", AND "PUBLIC FOLDER 5") associated with the shared folders on the second IHS 702, the third IHS 800, and the Nth IHS 802. Each of the third IHS 800 and the Nth IHS 802 may provide screens that are substantially similar to the data sharing screen providing on the second IHS 702 that is illustrated in FIG. 7f. Furthermore, each of the first IHS 700, the second IHS 702, the third IHS 800, and the Nth IHS 802 may operate according to blocks 6287a, 628b, 630a, 630b, 632a, 632b, 634a, and 634b to share data via the best peer-to-peer connections available until that peer-to-peer connection is ended. Thus, the first IHS 700 may use multiple communication systems to communicate with multiple IHSs simultaneously over peer-to-peer connections to share data, and may use a single communication system to provide multiple peer-to-peer connections if those peer-to-peer connections have the highest QoS using that communication system.

Although illustrative embodiments have been shown and described, a wide range of modification, change and substitution is contemplated in the foregoing disclosure and in some instances, some features of the embodiments may be employed without a corresponding use of other features.

Accordingly, it is appropriate that the appended claims be construed broadly and in a manner consistent with the scope of the embodiments disclosed herein.

What is claimed is:

1. An information handling system (IHS), comprising:
 a display system;
 a storage system;
 a plurality of wireless communication systems;
 a processing system that is coupled to the display system, the storage system, and the plurality of wireless communication systems; and
 a non-transitory memory system that is coupled to the processing system and that includes instructions that, when executed by the processing system, cause the processing system to provide a connection and sharing engine that is configured to:
  receive, through a direct communication with a local IHS using a first wireless communication system of the plurality of wireless communication systems, communication capabilities of the local IHS;
  select a second wireless communication system of the plurality of wireless communication systems based on the communication capabilities of the local IHS;
  establish, using the second wireless communication system and in response to selecting the second wireless communication system based on the communication capabilities of the local IHS, a wireless peer-to-peer connection with the local IHS;
  provide a graphical user interface for display on the display system that indicates at least some of the contents of a first data storage area that is included in the storage system, and that indicates at least some of the contents of a second data storage area that is included in the local IHS and that are determined through the wireless peer-to-peer connection;
  perform at least one of (1) sending data that is stored in the first data storage area through the wireless peer-to-peer connection to the second data storage area in response to at least one instruction received through the graphical user interface, and (2) storing data in the first data storage area that is received through the wireless peer-to-peer connection from the second data storage area in response to at least one instruction received through the graphical user interface;
  select a third wireless communication system of the plurality of wireless communication systems based on the communication capabilities of the local IHS; and
  automatically switch from the second wireless communication system to the third wireless communication system to provide the wireless peer-to-peer connection with the local IHS using the third wireless communication system in response to at least one of:
   a change in proximity of the local IHS, and
   a determination that the wireless peer-to-peer connection provides a faster data transfer rate using the third wireless communication system relative to the second wireless communication system.

2. The IHS of claim 1, wherein the change in proximity is determined using a wireless communication system of the plurality of wireless communication systems that is not proving the wireless peer-to-peer connection.

3. The IHS of claim 1, wherein the first wireless communication system that is used to receive the communication capabilities of the local IHS includes a Bluetooth wireless communication system, and wherein the communication capabilities of the local IHS are received without performing a pairing operation.

4. The IHS of claim 3, wherein the Bluetooth wireless communication system receives the communication capabilities of the local IHS without performing a paring operation using an OBject Exchange (OBEX) protocol.

5. The IHS of claim 1, wherein the connection and sharing engine is further configured to:
 provide power to the second wireless communication system in response to receiving the communication capabilities of the local IHS using the first wireless communication system, wherein the second wireless communication system is not receiving power prior to receiving the communication capabilities of the local IHS.

6. The IHS of claim 1, wherein the connection and sharing engine is further configured to:
 determine that the at least some of the contents of the first data storage area are available for sharing with the local IHS and, in response, provide access to the at least some of the contents of the first data storage area to the local IHS through the wireless peer-to-peer connection.

7. A local connection and sharing system, comprising:
 a first local information handling system (IHS) including a plurality of first local IHS wireless communication systems; and
 a second local IHS including at least one second local IHS wireless communication system;
 wherein the first local IHS is configured to:
  receive, through a direct communication with the second local IHS using a first of the plurality of first local IHS wireless communication systems, communication capabilities of the second local IHS;
  select a second of the plurality of first local IHS wireless communication systems based on the communication capabilities of the second local IHS;
  establish, using the second of the plurality of first local IHS wireless communication systems and in response to selecting the second of the plurality of first local IHS wireless communication systems based on the communication capabilities of the second local IHS, a wireless peer-to-peer connection with the second local IHS;
  provide a graphical user interface for display on the first local IHS that indicates at least some of the contents of a first data storage area that is coupled to the first local IHS, and that indicates at least some of the contents of a second data storage area that is coupled to the second local IHS and that are determined through the wireless peer-to-peer connection;
  perform at least one of (1) sending data that is stored in the first data storage area through the wireless peer-to-peer connection to the second data storage area in response to at least one instruction received through the graphical user interface, and (2) storing data in the first data storage area that is received through the wireless peer-to-peer connection from the second data storage area in response to at least one instruction received through the graphical user interface;
  select a third of the plurality of first local IHS wireless communication systems based on the communication capabilities of the second local IHS; and
  automatically switch from the second of the plurality of first local IHS wireless communication systems to the third of the plurality of first local IHS wireless communication systems to provide the wireless peerto-peer connection with the second local IHS using the third of the plurality of first local IHS wireless communication systems in response to at least one of:
a change in proximity of the second local IHS relative to the first local IHS: and
a determination that the wireless peer-to-peer connection with the second local IHS provides a faster data transfer rate using the third of the plurality of first local IHS wireless communication systems relative to the second of the plurality of first local IHS wireless communication systems that is being used to provide the wireless peer-to-peer connection with the second local IHS.

8. The local connection and sharing system of claim 7, wherein the first local IHS is further configured to:
automatically switch from the first of the plurality of first local IHS wireless communication systems to the second of the plurality of first local IHS wireless communication systems in response to selecting the second of the plurality of first local IHS wireless communication systems based on the communication capabilities of the second local IHS.

9. The local connection and sharing system of claim 7, wherein the first of the plurality of first local IHS wireless communication systems that is used to receive the communication capabilities of the second local IHS includes a Bluetooth wireless communication system, and wherein the communication capabilities of the second local IHS are received without performing a pairing operation.

10. The local connection and sharing system of claim 9, wherein the Bluetooth wireless communication system receives the communication capabilities of the second local IHS without performing a paring operation using an OBject Exchange (OBEX) protocol.

11. The local connection and sharing system of claim 7, wherein the first local IHS is further configured to:
provide power to the second of the plurality of first local IHS wireless communication systems that is used to provide the wireless peer-to-peer connection with the second local IHS in response to receiving the communication capabilities of the second local IHS using the first of the plurality of first local IHS wireless communication systems, wherein the second of the plurality of first local IHS wireless communication systems is not receiving power prior to receiving the communication capabilities of the second local IHS.

12. The local connection and sharing system of claim 7, wherein the first local IHS is further configured to:
determine that the at least some of the contents of the first data storage area are available for sharing with the second local IHS and, in response, provide access to the at least some of the contents of the first data storage area to the second local IHS through the wireless peer-to-peer connection.

13. The local connection and sharing system of claim 7, further comprising:
a third local IHS including at least one third local IHS wireless communication system;
wherein the first local IHS is configured to:
receive, through a direct communication with the third local IHS using the first of the plurality of first local IHS wireless communication systems, communication capabilities of the third local IHS;
select a third of the plurality of first local IHS wireless communication systems based on the communication capabilities of the third local IHS;
establish, using the third of the plurality of first local IHS wireless communication systems and in response to selecting the third of the plurality of first local IHS wireless communication systems based on the communication capabilities of the third local IHS, a wireless peer-to-peer connection with the third local IHS;
provide the graphical user interface on the first local IHS that indicates at least some of the contents of the first data storage area that is coupled to the first local IHS, and that indicates at least some of the contents of a third data storage area that is coupled to the third local IHS and that are determined through the wireless peer-to-peer connection; and
perform at least one of (1) sending data that is stored in the first data storage area through the wireless peer-to-peer connection to the third data storage area in response to at least one instruction received through the graphical user interface, and (2) storing data in the first data storage area that is received through the wireless peer-to-peer connection from the third data storage area in response to at least one instruction received through the graphical user interface.

14. A method for locally connecting and sharing data, comprising:
receiving, by a first local information handling system (IHS) through a direct communication with a second local IHS using a first wireless communication system of a plurality of wireless communication systems of the first local IHS, communication capabilities of the second local IHS;
selecting, by the first local IHS, a second wireless communication system of the plurality of wireless communication systems of the first local IHS based on the communication capabilities of the second local IHS;
establishing, by the first local IHS using the second wireless communication system and in response to selecting the second wireless communication system based on the communication capabilities of the second local IHS, a wireless peer-to-peer connection with the second local IHS;
providing, by the first local IHS, a graphical user interface for display that indicates at least some of the contents of a first data storage area that is included in the first local IHS, and that indicates at least some of the contents of a second data storage area that is included in the second local IHS that are determined using the wireless peer-to-peer connection;
performing, by the first local IHS, at least one of (1) sending data that is stored in the first data storage area through the wireless peer-to-peer connection to the second data storage area in response to at least one instruction received through the graphical user interface, and (2) storing data in the first data storage area that is received through the wireless peer-to-peer connection from the second data storage area in response to at least one instruction received through the graphical user interface;
selecting, by the first local IHS, a third wireless communication system of the plurality of wireless communication systems of the first local IHS based on the communication capabilities of the second local IHS; and
automatically switching, by the first local IHS, from the second wireless communication system to the third wireless communication system to provide the wireless peer-to-peer connection between the first local IHS and the second local IHS using the third wireless communication system in response to at least one of:
a change in proximity between the first local IHS and the second local IHS; and
a determination that the wireless peer-to-peer connection provides a faster data transfer rate using the third wireless communication system relative to the second wireless communication system.

15. The method of claim 14, further comprising:
automatically switching, by the first local IHS, from the first wireless communication system to the second wireless communication system in response to selecting the second wireless communication system based on the communication capabilities of the second local IHS.

16. The method of claim 14, wherein the first wireless communication system that is used to receive the communication capabilities of the second local IHS includes a Bluetooth wireless communication system, and wherein the communication capabilities of the second local IHS are received without performing a pairing operation.

17. The method of claim 16, wherein the Bluetooth wireless communication system receives the communication capabilities of the second local IHS without performing a paring operation using an OBject Exchange (OBEX) protocol.

18. The method of claim 14, further comprising:
providing, by the first local IHS, power to the second wireless communication system in response to receiving the communication capabilities of the second local IHS using the first wireless communication system, wherein the second wireless communication system is not receiving power prior the receiving of the communication capabilities of the second local IHS.

19. The method of claim 14, further comprising:
determining, by the first local IHS, that the at least some of the contents of the first data storage area are available for sharing with the second local IHS and, in response, providing access to the at least some of the contents of the first data storage area to the second local IHS through the wireless peer-to-peer connection.

20. The method of claim 14, further comprising:
receiving, by the first local IHS through a direct communication with a third local IHS using the first wireless communication system, communication capabilities of the third local IHS;
selecting, by the first local IHS, a third wireless communication system of the plurality of wireless communication systems of the first local IHS based on the communication capabilities of the third local IHS;
establishing, by the first local IHS using the third wireless communication system and in response to selecting the third wireless communication system based on the communication capabilities of the second local IHS, a wireless peer-to-peer connection with the third local IHS;
providing, by the first local IHS, the graphical user interface for display that indicates at least some of the contents on the first data storage area, and that indicates at least some of the contents of a third data storage area that is included in the third local IHS and that are determined through the wireless peer-to-peer connection; and,
performing, by the first local IHS, at least one of (1) sending data that is stored in the first data storage area through the wireless peer-to-peer connection to the third data storage area in response to at least one instruction received through the graphical user interface, and (2) storing data in the first data storage area that is received through the wireless peer-to-peer connection from the third data storage area in response to at least one instruction received through the graphical user interface.

* * * * *